March 8, 1966     A. GRAF     3,238,631
METHOD AND APPARATUS FOR CLINOMETRIC LAND MEASUREMENTS
Filed July 14, 1964     2 Sheets-Sheet 1

March 8, 1966  A. GRAF  3,238,631
METHOD AND APPARATUS FOR CLINOMETRIC LAND MEASUREMENTS
Filed July 14, 1964  2 Sheets-Sheet 2

United States Patent Office 3,238,631
Patented Mar. 8, 1966

3,238,631
METHOD AND APPARATUS FOR CLINOMETRIC LAND MEASUREMENTS
Anton Graf, Lochham, near Munich, Germany, assignor to Continental Elektroindustrie A.G., Askania-Werke, Berlin-Mariendorf, Germany, a corporation of Germany
Filed July 14, 1964, Ser. No. 382,603
Claims priority, application Germany, July 15, 1963, G 38,196
8 Claims. (Cl. 33—205.5)

This invention relates to a method and apparatus for measuring and recording land tides, bed or strata movements and similar phenomena.

It has heretofore been the practice to install clinometers in mines or deep caves in order to measure land tides and similar phenomena. The clinometers are employed to record the inclination of their locations continuously or at intervals as a function of time. Horizontally pivoted pendulums of high sensitivity are normally used as clinometers. Installation at depths is generally required because measurements on the surface, for purposes such as land tide research or investigation of bed movements in the earth's upper crust, are not feasible because of the effects of ambient temperature and barometric pressure on the measurement. In order to measure land tides, it has therefore been a practical necessity to select special locations having natural or man-made formations permitting the setting up and observation of instruments. A fully systematic investigation of bed or mass movements of the upper earth crust has accordingly not been possible, because of such limitations.

It is the principal object of the present invention to provide a method and apparatus making practical the systematic and complete investigation of earth tides and mass and fault movements of the earth's crust, and, by the same token, facilitating other measurements of the same general type.

A more specific object of the invention is to provide a novel construction for a clinometer, particularly of the type having a vertically suspended pendulum pivoted on a horizontal axis of rotation, which can be used for such systematic investigations.

Still another object of the invention is to design a clinometer of the above-mentioned type providing measurements of inclinations in two perpendicular directions with respect to the vertical.

In the method and apparatus by which these objects are accomplished, a vertically suspended pendulum, arranged in a housing and pivoted on a horizontal axis on a suspension adjustable horizontally by remote-controlled adjusting means, is introduced into a vertical (or substantially vertical) bore extending to a depth of about 30 meters, and inclinations of the pendulum with respect to the pendulum housing are detected by electrical sensing means secured in the instrument housing and transmitted over considerable distances on the earth's surface. More complete understanding of these general features of the method and apparatus, together with more detailed aspects, will be obtained from consideration of the embodiment of the invention illustrated in the attached drawings, in which:

Figure 1:
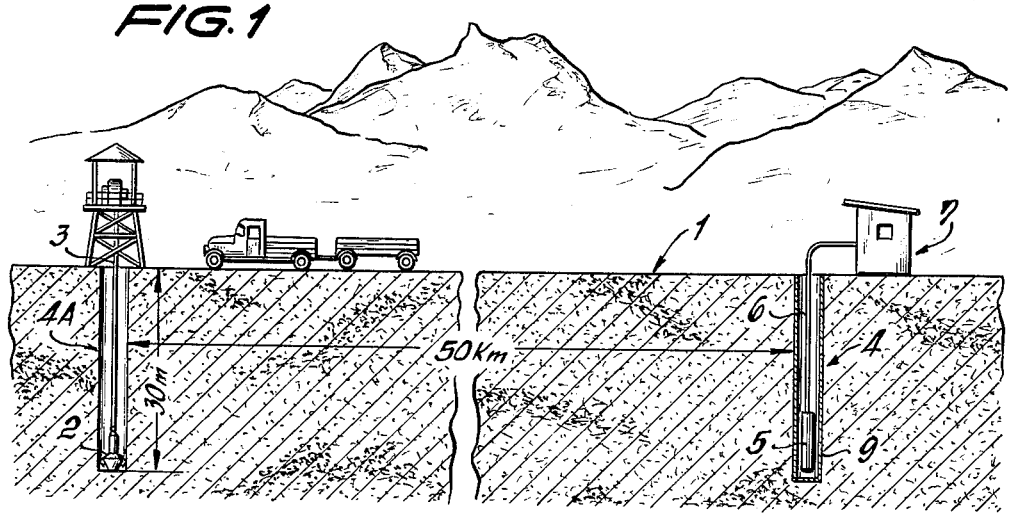
FIGURE 1 illustrates the general method for the systematic investigation of mass movements of the earth's crust and for determining the effects of land tides at points which are geographically remote.

As shown in FIGURE 1, bores 4 and 4A are drilled into the earth's surface by means of a drilling tool (not shown) operated in a conventional drill pipe 3, down to a depth of about 30 meters. The effects of temperature and barometric pressure variations and other error-causing factors are reduced to such an extent at this depth that mass or formation movements can be satisfactorily determined by means of a clinometer 5, to be described, introduced into the borehole 4. The boreholes 4, 4A, may have, for an overall profile length (other boreholes not shown) of 500 km., for example, a spacing of 50 km. The boreholes preferably have a relatively small diameter, say 150 mm. The clinometer 5, which is shown in the borehole 4, is connected with the earth's surface by means of a cable 6, and the borehole also is provided with an electrical instrument shelter or station 7 for the remote control of the clinometer and for indicating and recording the inclinations. The measuring instrument station 7 may be a more or less permanent installation permitting recording of the inclination over very long periods.

Figure 2:
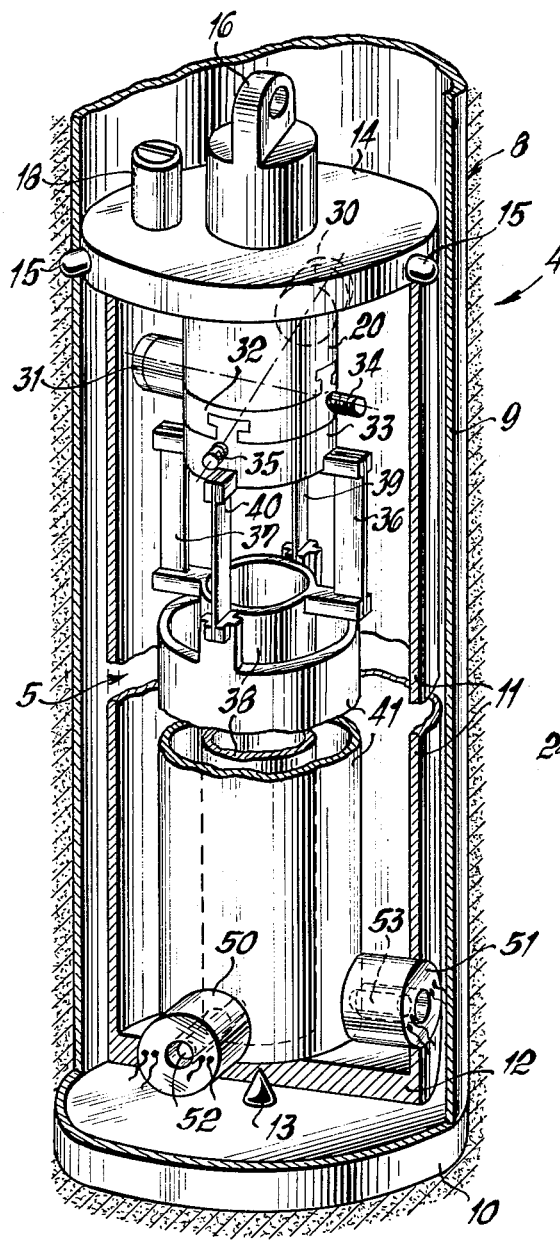
FIGURE 2 is a view in isometric perspective of a clinometer constructed in accordance with the invention.

As shown in FIGURE 2, the wall 8 of the borehole 4 is lined with a pipe 9 closed at its bottom end by a cap 10, and inside the pipe 9 is disposed a cylindrical housing 11 of the clinometer 5. The housing 11 has its base plate 12 resting on the cap 10 of the pipe on a centering pin 13. On an upper circular plate 14 of the clinometer are provided radial centering pins 15 distributed about the circumference of the head 14 and seated therein with compression springs (not shown). Under the force of the springs, the pins 15 center the housing of the clinometer in the pipe 9. The upper plate 14 bears an eye 16 to which is secured a hoisting rope (not shown). As shown at 18, there is provided an electrical connector for connection of the cable 6.

To the under side of the upper plate 14 is secured a round housing 20. In this housing are arranged two auxiliary electrical clinometer elements of the construction illustrated in FIGURE 2A. Each of these clinometer elements consists of a pendulum 22, mounted for swinging motion on a leaf spring 21, and rigidly connected to two iron rods 23, forming the core of a differential transformer having windings 24, 25. The differential transformer modulates an alternating voltage in response to deflections of the pendulum 22, as will be further pointed out in connection with FIGURE 3; the amplitude of the voltage is proportional to the angle of inclination of the pendulum 22 and its phase reverses with the direction of deflection. The two clinometers of the construction shown in FIGURE 2A have pendulums moving in respective perpendicular planes. They need not be highly sensitive, but serve to indicate to an observer at 7 by how much and in what direction the housing 11 is inclined with respect to the vertical in each of the vertical coordinate planes.

The housing 20 also serves as a support for structure in which two electric motors 30 and 31 respectively adjust the position of two sliding carriages 32 and 33.

The carriage 32 is slideably mounted in a suitably keyed track on the housing 20 in the horizontal direction of a drive-guide 34, and the carriage 33 slideably mounted in a similarly keyed track on the carriage 32 in the horizontal direction of a drive-guide 35. The motions are perpendicular to each other, the motor 31 displacing the carriage 32 with respect to the housing 20 while the motor 30 displaces the carriage 33 with respect to the carriage 32.

On the carriage 33 there is suspended a pendulum 38 by means of two leaf springs 36 and 37. The pendulum 38 is a hollow tube preferably about 200 cm. long. Leaf springs 39 and 40, which are likewise supported by carriage 33, suspend a second tubular pendulum 41, of similar length and surrounding the pendulum 38. The pendulums 38 and 41 undergo motion in mutually perpendicular vertical planes with respect to the supporting structure, these planes being the same (which term of course includes parallelism of planes) as those of the auxiliary pendulums which are employed in bringing them into operating range.

The positions of the two pendulums with respect to the housing structure are measured by differential transformers 50 and 51, whose windings are mounted on the housing 11, and produce suitably indicative voltages. The differential transformer 50, having an iron core 52 secured to the pendulum 38 through an opening in the tubular pendulum 41, serves as a transducer or detector of the position of the pendulum 38, while the differential transformer 51 serves as a transducer or detector of the position of the pendulum 41, having an iron core 53 secured thereto.

Figure 3:
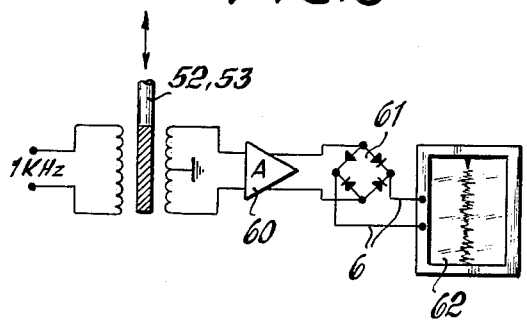
FIGURE 3 is a schematic diagram of a recording circuit employed in the device.

As may be seen in FIGURE 3, the ouput voltage of the differential transformer, governed by the relative position of the pin 52 or 53, is amplified by means of an amplifier 60 and continuously recorded, after rectification in a rectifier 61, by means of a recorder 62 (located at the instrument station 7).

After each borehole has been drilled and lined, the clinometer is lowered into the borehole. It is generally impossible to give the borehole a vertical inclination accuracy of less than a degree or so, so that the sensitive clinometer, which inherently must have a relatively narrow operating range, is in general in one of its two limit positions when so installed. In order to bring it into the operating range of the differential transformers 50 and 51, the suspension point of both pendulums 38 and 41 is displaced in the horizontal directions, as necessary, by means of a control circuit shown in FIGURE 4, driving each of the motors 31 or 30 until both pendulums can move freely in the housing in the operating range of their respective sensing transducers. The operating range of each pendulum comprises, for example, an arc of ±0.2 second. As will be evident, there is generally produced a very small tilt of the cores of the differential transformers with respect to their design axes, but the effects of this are negligible as an error-producing factor.

Figure 4:
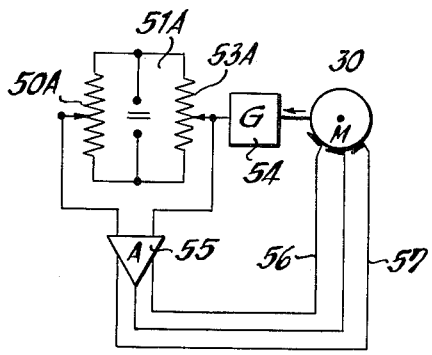
FIGURE 4 is a schematic diagram of a position-adjusting circuit employed in the device.
Figure 2A:
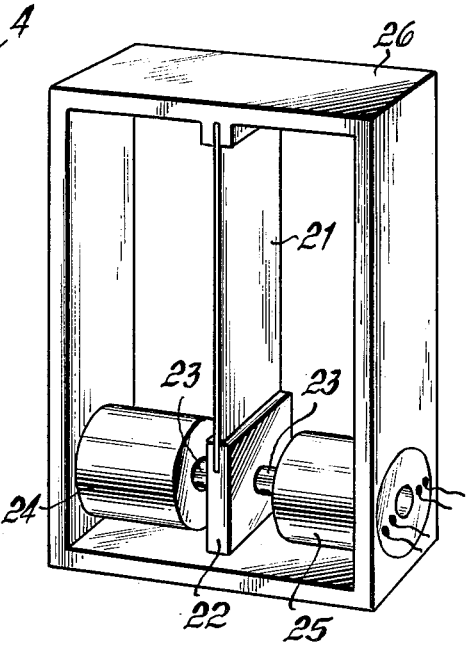
FIGURE 2A is a view in enlarged isometric perspective of one of two auxiliary clinometer elements of the clinometer of FIGURE 2.

In accordance with the indication of the rough inclination of the housing given by the circuits of FIGURE 2A at the station 7, a potentiometer 50A, in a D.-C. voltage bridge 51A, is adjusted, as shown in FIGURE 4. The other bridge arm resistances are provided by a second potentiometer 53A, which is driven by transmission 54, for example, by the motor 30. The transmission 54 also shifts the carriage 32. The error voltage of the bridge 51A is fed to the input of an amplifier 55. With positive or negative error voltage, the motor 30 is driven in one direction or the other by the line 56 or 57; when the error voltage is zero, the motor 30 is of course stopped. By adjusting the potentiometer 50A, the carriage 32 can therefore be given any desired position with respect to the housing 20. Corresponding control means are provided for the motor 31, for adjustment in the other direction. If so desired, the potentiometer 50A may of course be directly adjusted by the output of the device of FIGURE 2A.

When the clinometer is introduced into the borehole, care must of course be taken to assure that the two measuring pendulums move in known planes. Thus, for example, an inclination in North-South direction can be determined by one measuring system, and in the East-West direction by the other measuring system. In order to assure such orientation of the measuring pendulums, the pipe in the bore hole can be provided with corresponding guides in which the housing is brought down into position at the bottom of the borehole. Once the positions of the main measuring pendulums have been set so that their respective position-transducers are within their useful range, using the coarser auxiliary measurements for this purpose, small changes in inclination of the borehole are readily recorded.

In order to assure most accurate operation, particularly in order to detect drifts in the electrical circuits, a remote-controlled calibrating device is desirably provided, which is always ready to use and which is actuated from the surface; such a device may consist, for example, of a small coil on the pendulum housing, which acts on a small iron bar when current flows in the coil. The remote calibration can also be effected by an auxiliary motor which exerts a known torque on each respective pendulum. Alternatively, it is possible to produce the torque by adding or removing a small weight on a precision lever arm, which may be arranged on the pendulums.

The recording of the movements of the pendulums with respect to the pendulum housing is preferably done by a multiple-point recorder, which records simultaneously, in addition to the pendulum movements of both pendulums, the temperature and the barometric pressure on the earth's surface and, where desired, in the borehole.

The teachings of the invention will readily be recognized by those skilled in the art to extend to embodiments far different in both appearance and details of function from the one illustrated and described. Some examples will readily be apparent, while others will become apparent only on study. Accordingly the scope of the patent protection given the invention should extend to all practice of the invention as defined in the appended claims, and equivalents thereof.

What is claimed is:

1. A method of producing a borehole clinometric record comprising:
    (a) lowering into a borehole a sensitive clinometer of the type having a housing, a suspension mounted on the housing, a pendulum mounted on the suspension, and a position-transducer acting between the pendulum and the housing,
    (b) producing, independently of the piston-transducer, an indication of the inclination of the housing,
    (c) moving the suspension within the housing in response to said indication to move the pendulum with respect to the housing to bring the clinometer within its operating range, and
    (d) thereafter recording changes in the position-transducer output.

2. A method of producing a recording of clinometric profiles near the surface of the earth comprising drilling a plurality of spaced boreholes, lowering into each borehole a sensitive narrow-range clinometer of the type producing an electrical signal indicative of relative position of the housing and a pendulum, and an auxiliary relatively insensitive broader-range clinometer of the same general type affixed to the housing, bringing each of the sensitive clinometers into operating range in accordance with the electrical signal of the auxiliary clinometer, and then recording the outputs of the sensitive clinometers over long periods of time.

3. Clinometer apparatus for measurements in boreholes and similar locations comprising:
    (a) a housing adapted to be positioned approximately vertically,
    (b) a first pendulum suspended within the housing,
    (c) a second pendulum suspended within the housing for motion corresponding to that of the first pendulum but of lesser sensitivity,
    (d) a first position-transducer having portions on the first pendulum and the housing to produce highly accurate remote indications of relative horizontal position over a limited range of relative positions,
    (e) a second position-transducer having portions on the second pendulum and the housing to produce comparatively rough remote indications of inclination of the housing,
    (f) and means for moving one of said portions of the first transducer horizontally in accordance with the output of the second transducer to bring said first transducer portions into said limited range.

4. The apparatus of claim 3 having both pendulums suspended for rotational motion in the same plane.

5. The apparatus of claim 4 having two of each of said pendulums, in perpendicular vertical planes.

6. The apparatus of claim 5 having one of said first pendulums suspended from a member movable on a horizontal track on the housing, and the other of said first pendulums suspended from a member movable on a horizontal track on the first member, said moving means including a motor coupled to each suspending member.

7. Clinometer apparatus for measurements in boreholes and similar locations comprising:
   (a) a housing adapted to be positioned approximately vertically,
   (b) a pendulum suspended within the housing,
   (c) a position-transducer having portions on the pendulum and the housing to produce highly accurate remote indications of relative horizontal position over a limited range of relative positions,
   (d) a second position-transducer producing comparatively rough indications of inclination of the housing,
   (e) and means for moving one of said portions of the first transducer horizontally in accordance with the indication of the second transducer to bring the first transducer portions into said limited range.

8. A method of producing a borehole clinometric record comprising:
   (a) lowering into a borehole a sensitive clinometer of the type having a housing, a suspension mounted on the housing, a pendulum mounted on the suspension, and a position-transducer acting between the pendulum and the housing,
   (b) lowering into the borehole an auxiliary clinometer of broader operating range,
   (c) moving the suspension of the sensitive clinometer within the housing in accordance with the indication of the auxiliary clinometer, and
   (d) thereafter recording changes in the position-transducer output.

References Cited by the Examiner

UNITED STATES PATENTS

| | | | |
|---|---|---|---|
| 909,060 | 1/1909 | Carrigan | 33—219 |
| 2,674,049 | 4/1954 | James | 33—205 |

ISAAC LISANN, *Primary Examiner.*

W. K. QUARLES, JR., *Assistant Examiner.*